Jan. 13, 1931.  S. A. THORNE  1,789,162
AUTOMOBILE LIGHT
Filed Aug. 23, 1929  3 Sheets-Sheet 1
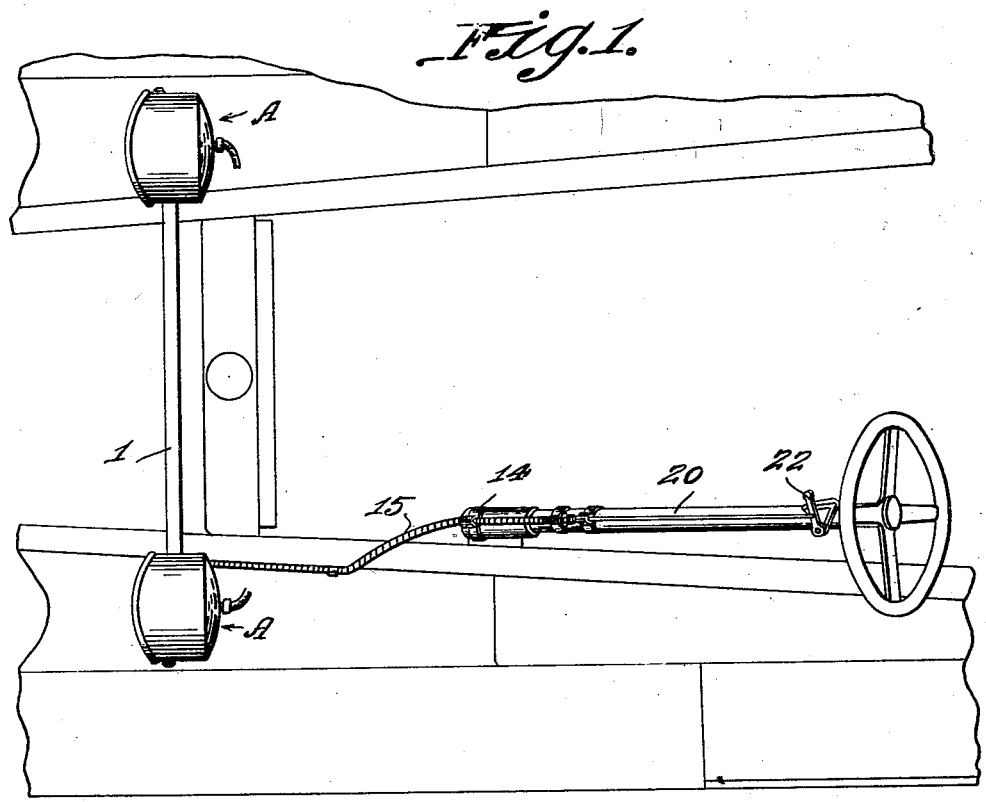
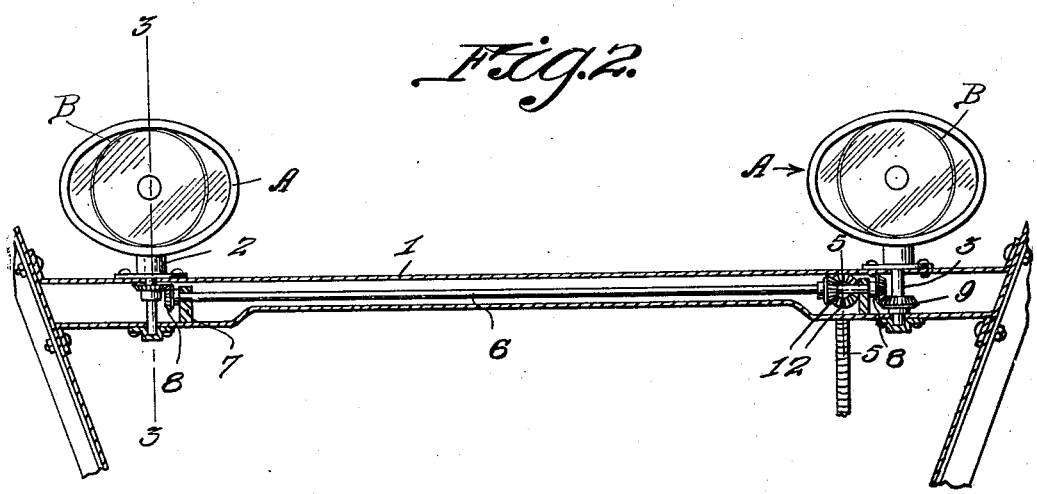
Samuel A. Thorne,
INVENTOR
BY Victor J. Evans
ATTORNEY Jan. 13, 1931.  S. A. THORNE  1,789,162
AUTOMOBILE LIGHT
Filed Aug. 23, 1929   3 Sheets-Sheet 2
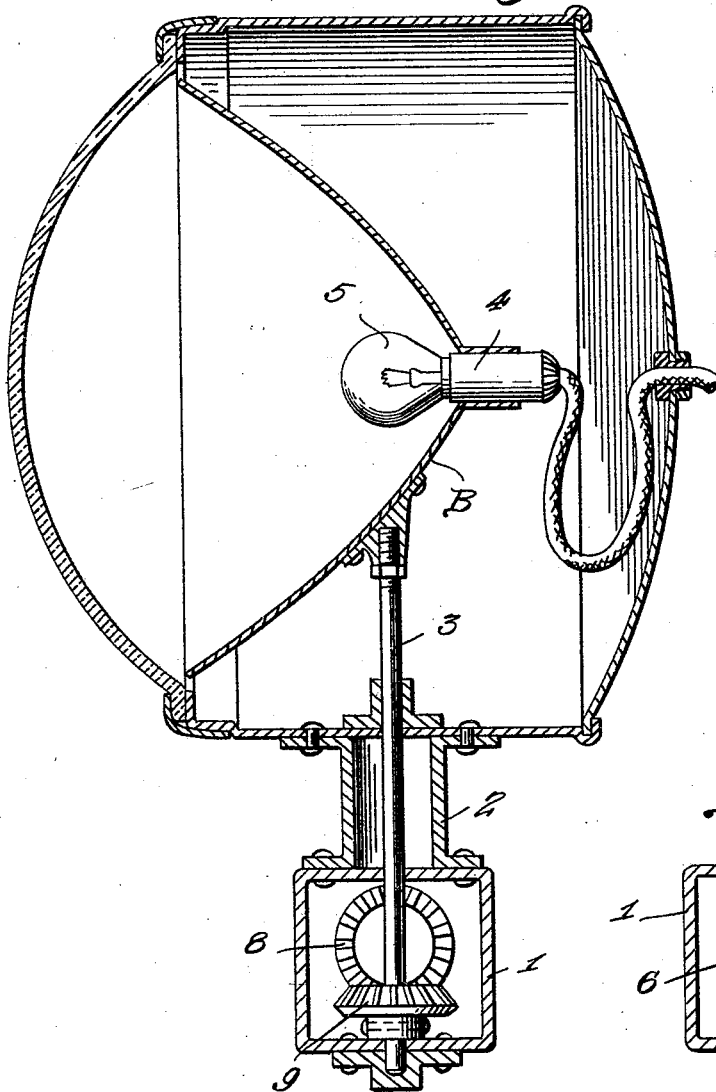
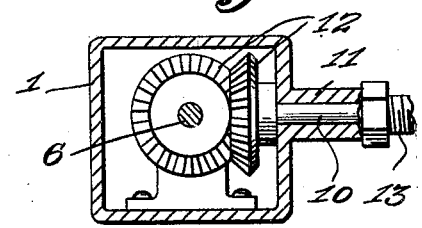
Samuel A. Thorne,
INVENTOR.
BY Victor J. Evans
ATTORNEY.

Jan. 13, 1931. S. A. THORNE 1,789,162
AUTOMOBILE LIGHT
Filed Aug. 23, 1929 3 Sheets-Sheet 3

Samuel A. Thorne,
INVENTOR.

BY Victor J. Evans,
ATTORNEY.

Patented Jan. 13, 1931

1,789,162

UNITED STATES PATENT OFFICE

SAMUEL A. THORNE, OF VENTURA, CALIFORNIA

AUTOMOBILE LIGHT

Application filed August 23, 1929. Serial No. 387,940.

This invention relates to dirigible lights for motor vehicles and the like, the general object of the invention being to provide means for turning the reflectors and lamps of the headlamps from the steering mechanism when such mechanism is actuated to cause the vehicle to take a turn so as to illuminate the road on turns and curves as well as the straight portions of the road and also to provide means for projecting colored rays of light from the right side of the right lamp when the vehicle is being turned to the right and from the left side of the left lamp when the vehicle is being turned to the left, these rays acting as directional signals.

Another object of the invention is to provide means for holding the reflectors in the lamps stationary when it is not desired to have the reflectors turn.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a fragmentary plan view showing the invention in use.

Figure 2 is a front elevation with parts in section showing the supporting and operating means for the lamps and their reflectors.

Figure 3 is a section on line 3—3 of Figure 2.

Figure 5 is a section on line 5—5 of Figure 2.

Figure 4:
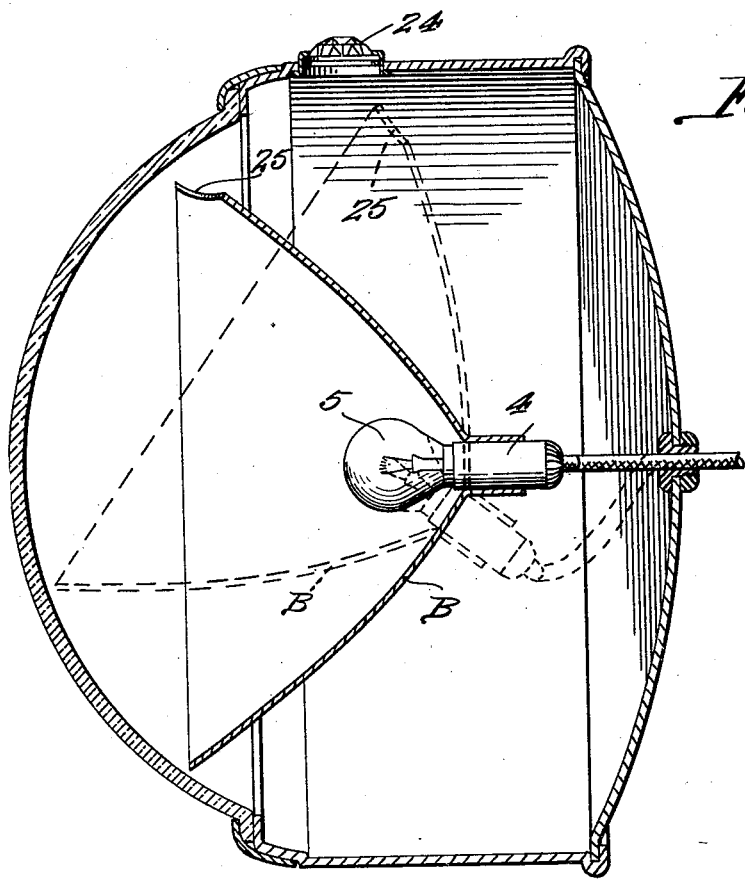
Figure 4 is a horizontal section through Figure 3.
Figure 7:
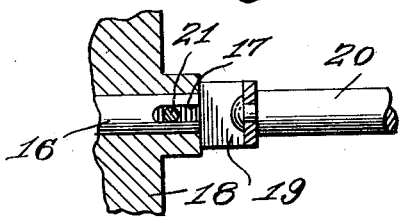
Figure 7 is a sectional detail view showing the means for connecting and disconnecting the gear of the flexible shaft with the said shaft.
Figure 6:
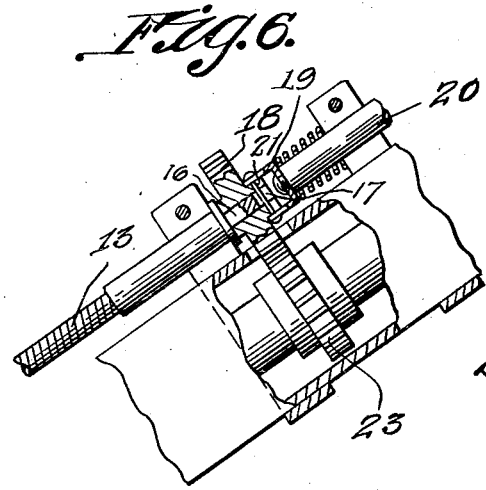
Figure 6 is a detail view partly in section showing the means for operating the flexible shaft of the device from the steering shaft.

In these views the numeral 1 indicates an elongated housing extending across the front of the vehicle and having its ends suitably connected with the fenders or other parts of the vehicle. The tubular stems 2 of the lamp housings A have their lower ends fastened to the housing 1 and the reflector B of each lamp is attached to a shaft 3 which passes through the stem 2 into the housing 1, the shaft being journaled in said housing 1 and in the lower parts of the lamp housing. The sockets 4 for the lamp bulbs 5 are carried by the reflectors so that the sockets and lamps will move with the reflectors. A horizontally arranged shaft 6 is located in the housing 1 and is journaled in the uprights 7 placed in said housing and this shaft has a beveled gear 8 at each end thereof, these gears meshing with the beveled gears 9 on the shaft 3. This gearing is so arranged that the reflectors will be moved in unison when the shaft 6 is turned. A shaft 10 is journaled in a tubular part 11 extending rearwardly from the housing 1 and this shaft is connected with the shaft 6 by the beveled gears 12. A flexible housing 13 has one end connected with the tubular part 11 and a portion of this flexible housing is connected by clamps 14 with the steering column. A flexible shaft (not shown) is arranged in the housing 13 and has one end connected with the shaft 10 and its other end with the shaft 16 which has a slot 17 in its free end.

A gear 18 is rotatably mounted on the shaft 16 and a yoke member 19 pivotally connected with the lower end of the shaft 20 carries a pin 21 which passes through a slot in the hub of the gear 18 and through the slot 17 so that when the pin is in engagement with the slot 17, the gear 18 is connected with the shaft 16, but when the shaft 20 is moved upwardly by the hand lever 22 on the steering column adjacent the steering wheel the pin 21 will be moved out of the slot 17 and thus the gear 18 will be disconnected from the shaft 16. The gear 18 meshes with the gear 23 connected with the steering shaft so that when the gear 18 is connected with the shaft 16 the flexible shaft will be actuated when the steering shaft is turned and thus the reflectors B will be turned from said flexible shaft through the gearing and shaft above described.

From the foregoing it will be seen that the reflectors will be actuated every time the steering mechanism is operatd to cause the vehicle to make a turn or take a curve in the road so that the rays of light will be directed on the curved portions of the road. When it is not desired to have the reflectors move with the steering mechanism, such as during the day, the lever 22 can be moved to actuate the yoke member 19 through means of the shaft 20 so that the gear 18 will be disconnected from the flexible shaft.

A colored lens 24 is placed in the outer side of each lamp housing and a notch 25 is formed in the outer wall of each reflector so that when the reflectors are in their normal positions no light will pass through the lens 24. However, when the reflectors are turned, as shown in dotted lines in Figure 4, some of the rays of light will pass through the colored lens and be projected through the lens to that side of the vehicle which is nearest to the edge of the road. Thus when the vehicle is making a right turn or taking a right curve colored rays of light will be projected from the right side of the right lamp and when the vehicle is taking a left curve or is being turned to the left colored rays of light will be projected from the left side of the left lamp. These rays will act to indicate which way the vehicle is being turned.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a vehicle and in combination with its head lamps and their reflectors, a tubular member horizontally arranged and having its ends connected to the front fenders of the vehicle, tubular stems having their lower ends connected with the top of the tubular member, a lamp housing connected with the upper part of each stem, a shaft passing through each stem and connected with the reflector in each housing, the lower ends of the shafts being journaled in the horizontal tubular member, gears on the shafts and arranged in the tubular member, a horizontal shaft journaled in the tubular member, gears thereon meshing with the before mentioned gears, means for automatically turning the horizontal shaft when the steering mechanism of the vehicle is operated to turn the vehicle to either the right or left, such means comprising a flexible shaft geared to the horizontal shaft and rotatably connected to the lower part of the steering column, a stub shaft connected with the rear end of the flexible shaft and having a slot therein, a gear on said stub shaft having a slot in its hub registering with the first slot, a lever pivoted to the steering column, a link connected therewith, a yoke at the lower end of the link, a pin carried by the yoke for engaging the slots when the lever is in one position and disengaging the slots when the lever is in another position and a gear on the steering shaft meshing with the gear on the stub shaft.

In testimony whereof I affix my signature.

SAMUEL A. THORNE.